United States Patent
Mahdi Hayder et al.

(10) Patent No.: US 10,908,369 B1
(45) Date of Patent: Feb. 2, 2021

(54) FLEXIBLE ONBOARD OPTICS FOR NETWORKING SWITCHES

(71) Applicant: Amazon Technologies, Inc., Seattle, WA (US)

(72) Inventors: Alaa Adel Mahdi Hayder, Seattle, WA (US); Alan Michael Judge, Dublin (IE); Scott Holt, Brier, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 15/633,687

(22) Filed: Jun. 26, 2017

(51) Int. Cl.
*H04J 14/00* (2006.01)
*G02B 6/42* (2006.01)
*H04Q 11/00* (2006.01)
*G02B 6/10* (2006.01)
*H04B 10/112* (2013.01)
*H04J 14/06* (2006.01)
*G02B 6/12* (2006.01)

(52) U.S. Cl.
CPC ............ *G02B 6/4206* (2013.01); *G02B 6/10* (2013.01); *G02B 6/42* (2013.01); *G02B 6/4246* (2013.01); *H04B 10/1123* (2013.01); *H04J 14/06* (2013.01); *H04Q 11/0062* (2013.01); *G02B 2006/1215* (2013.01); *H04J 14/00* (2013.01); *H04Q 11/00* (2013.01); *H04Q 11/0001* (2013.01); *H04Q 2011/0011* (2013.01)

(58) Field of Classification Search
CPC .......... G02B 6/4206; G02B 6/42; G02B 6/10; G02B 6/4246; G02B 2006/1215; H04J 14/06; H04J 14/00; H04Q 11/0062; H04Q 2011/0011; H04Q 11/00; H04Q 11/0001; H04B 10/1123

USPC ..................................................... 398/43–103
See application file for complete search history.

(56) References Cited

U.S. PATENT DOCUMENTS

| | | | | |
|---|---|---|---|---|
| 5,884,017 A | * | 3/1999 | Fee ..................... | H04J 14/0284 370/217 |
| 6,400,477 B1 | * | 6/2002 | Wellbrook .......... | H04J 14/0295 398/45 |
| 6,429,974 B1 | * | 8/2002 | Thomas ............. | G02B 6/29383 359/237 |
| 6,445,841 B1 | * | 9/2002 | Gloeckner .......... | G02B 6/3514 385/17 |
| 6,535,313 B1 | * | 3/2003 | Fatehi ................. | H04J 14/0227 398/101 |

(Continued)

OTHER PUBLICATIONS

Lai et al, Low Power Compact 2x2 Thermooptic Silica on Silicon Waveguide Switch with Fast Response, May 1998, IEEE, All Document. (Year: 1998).*

(Continued)

*Primary Examiner* — Dibson J Sanchez
(74) *Attorney, Agent, or Firm* — Klarquist Sparkman, LLP

(57) ABSTRACT

Optical transceivers include receiver-side and transmitter-side optical switches that selectively route optical signals to be transmitted to a wavelength division multiplexer or demultiplexed received signals to corresponding photodetectors. Other optical signals are transmitted or received via optical fibers and directed by the optical switches without wavelength multiplexing. In some examples, the switches are programmable and data routing can be altered as desired. In other examples, the switches are fixed, and data routing is altered by switch replacement.

11 Claims, 12 Drawing Sheets

(56) References Cited

U.S. PATENT DOCUMENTS

| | | | |
|---|---|---|---|
| 6,792,176 B2* | 9/2004 | Nishi | H04Q 11/0005 385/16 |
| 6,975,811 B1* | 12/2005 | Kakizaki | H04Q 11/0062 398/2 |
| 7,099,578 B1* | 8/2006 | Gerstel | H04J 14/0295 370/216 |
| 7,174,096 B2* | 2/2007 | Berthold | H04J 14/0297 398/5 |
| 7,187,865 B2* | 3/2007 | Sparks | H04Q 11/0005 398/46 |
| 7,245,829 B1* | 7/2007 | Sindile | H04J 14/0227 398/45 |
| 7,310,478 B1* | 12/2007 | Norman | H04J 14/0227 398/3 |
| 7,720,383 B2* | 5/2010 | Akiyama | H04J 14/0209 398/49 |
| 8,693,864 B2* | 4/2014 | Kubo | H04J 3/1652 398/7 |
| 8,811,817 B2* | 8/2014 | Sakauchi | H04J 14/02 398/45 |
| 9,614,637 B2* | 4/2017 | Testa | H04J 14/0212 |
| 9,872,090 B2* | 1/2018 | Maeda | H04J 14/0294 |
| 10,298,319 B2* | 5/2019 | Kurosu | H04Q 3/52 |
| 2001/0046348 A1* | 11/2001 | Sarkimukka | H04J 14/0241 385/24 |
| 2002/0021464 A1* | 2/2002 | Way | H04B 10/50 398/79 |
| 2002/0067890 A1* | 6/2002 | Yoneda | G02B 6/12016 385/37 |
| 2002/0159117 A1* | 10/2002 | Nakajima | H04J 14/0212 398/83 |
| 2002/0191901 A1* | 12/2002 | Jensen | G02B 6/3588 385/24 |
| 2003/0007208 A1* | 1/2003 | Shibagaki | H04Q 11/0005 398/79 |
| 2003/0058497 A1* | 3/2003 | Park | H04Q 11/0005 398/82 |
| 2003/0185488 A1* | 10/2003 | Blumenthal | H04Q 11/0005 385/16 |
| 2003/0185566 A1* | 10/2003 | Nishi | H04J 14/0297 398/56 |
| 2004/0096151 A1* | 5/2004 | Svilans | G01J 3/12 385/27 |
| 2005/0094998 A1* | 5/2005 | Bernier | H04B 10/00 398/19 |
| 2006/0013586 A1* | 1/2006 | Pichler | H04Q 11/0005 398/50 |
| 2006/0045532 A1* | 3/2006 | Yano | H04B 10/25133 398/147 |
| 2006/0139625 A1* | 6/2006 | Purchase | G02B 6/12019 356/73.1 |
| 2008/0181605 A1* | 7/2008 | Palacharla | H04J 14/0209 398/50 |
| 2009/0297149 A1* | 12/2009 | Nakazato | G02B 6/2931 398/79 |
| 2011/0311217 A1* | 12/2011 | Horiuchi | H04Q 11/0062 398/5 |
| 2012/0201536 A1* | 8/2012 | Liu | H04J 14/0204 398/50 |
| 2013/0266318 A1* | 10/2013 | Abdul Manaf | H04J 14/0293 398/48 |
| 2014/0029944 A1* | 1/2014 | Sato | H04Q 11/00 398/50 |

OTHER PUBLICATIONS

Liao et al, A bi stable 2x2 optical switch monolithically integrated with variable optical attenuators, Oct. 2009, Optics Express, All Document. (Year: 2009).*

* cited by examiner

FLEXIBLE ONBOARD OPTICS FOR NETWORKING SWITCHES

BACKGROUND

Computer networks that serve large numbers of users can require multiple server systems and very high data rate communication connections among data centers that are separated by distances that are typically as much as 10 km to 150 km. Optical fiber communications systems have been deployed to provide the necessary communication connections as such systems provide low signal losses and high bit rates. Various communication formats are available such a coarse wavelength division multiplexing (CWDM), with channel spacings of 20 nm in a wavelength band of 1270 nm to 1610 nm, dense wavelength division multiplexing (DWDM) with typical channel spacings as small as 25 GHz, or Parallel Single Mode 4 Lane (PSM4) using eight separate fibers. Such communication formats continue to evolve to be more cost-effective and to enable higher data rates. Unfortunately, implementation of a particular communication format or set of formats typically requires dedicated hardware, and modifications subsequent to installation can be difficult. Moreover, in large, high capacity networks, the implementation of many different combinations of communication formats makes component standardization practically impossible. Network service or network upgrades then require access to numerous different components which may be difficult and expensive to keep available.

In typical implementations, system designers must select particular configurations of communication standards. Parallel or wavelength multiplexed communications are determined based on choices of field-installable optical modules. Such modules may be mounted on a switch motherboard or embedded in a switch ASIC package. As a result, any particular mix of communication configurations is determined during system design and installation, so that configurations changes are impractical. Additional network configuration and update approaches are needed that can provide flexibility.

DETAILED DESCRIPTION

Figure 1:
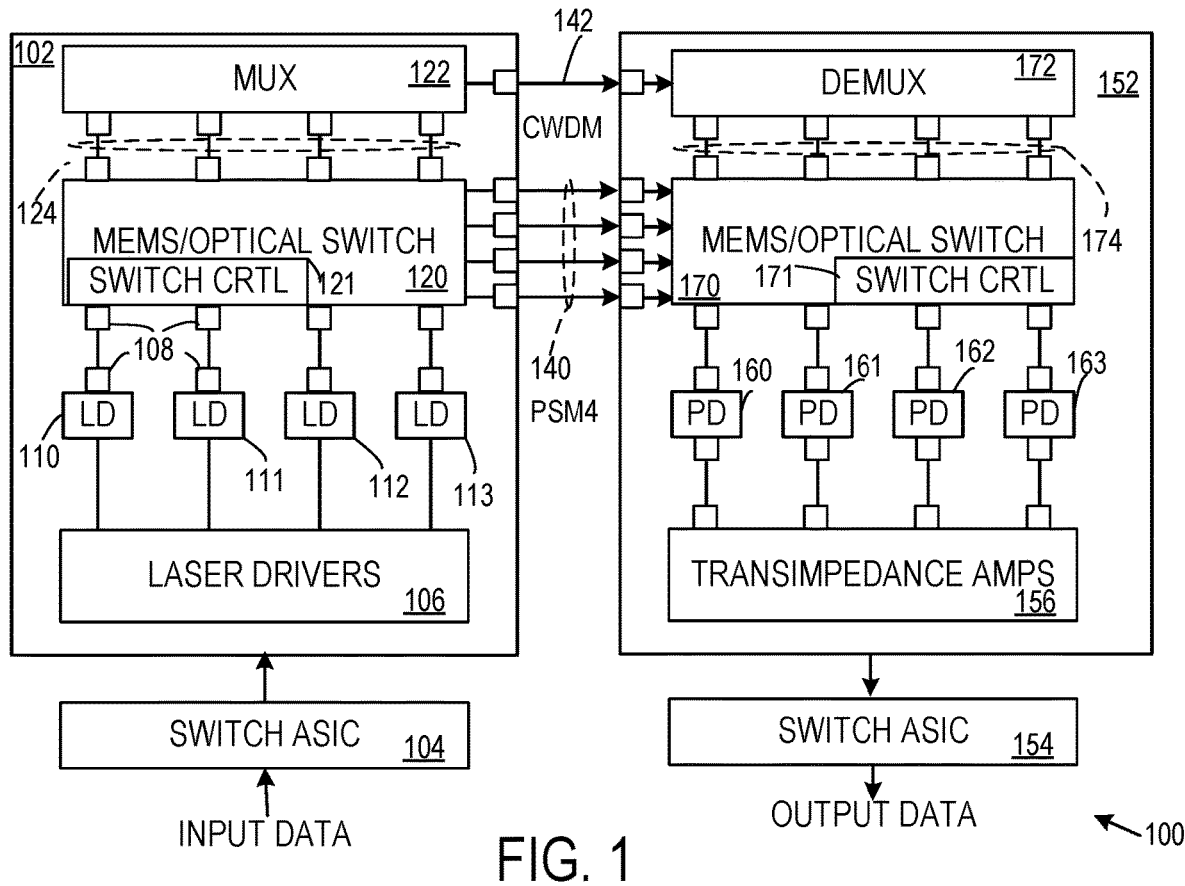
FIG. 1 illustrates a representative optical transmitter and a representative optical receiver that selectively transmit or receive optical data as individual channel data or as wavelength multiplexed channel data.

The following description is directed to technologies for combining serialized parallel fiber optic communications with wavelength division multiplexing in a manner that can be readily configured, maintained, and adapted to particular communication requirements. By combining optical channel switching with wavelength division multiplexing (WDM), high data rates can be achieved with flexible data allocation. Data can be directed for WDM communication to one or more selected fibers as WDM signals, or as non-multiplexed data to one or more fibers that carry single modulated optical signals. In this way, WDM and non-WDM communications can be selected as needed. System reconfiguration can be done with built-in optical switches and multiplexers. Such systems also permit any network node to be configurable to communicate with other network nodes without component changes.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many useful functional alternatives can be made, and such selections need not be better, smaller, or otherwise preferable to other selections.

As used herein, "optical signal" or refers to propagating electromagnetic radiation, typically at wavelengths between about 200 nm and 2 μm. In most practical examples, signal wavelengths are between 700 nm and 1700 nm. Typically, optical signals are modulated based on data to be communicated. "Detected" optical signal refers to an electrical signal produced in response to an optical signal delivered to a photodetector. In some examples, wavelengths are at or near 1550 nm and correspond to wavelengths used in wavelength division multiplexed (WDM) communication systems or so-call dense WDM (DWDM) systems. At least some of the disclosed embodiments can also be used with coarse wavelength division multiplexing (CWDM) systems, in which case the wavelengths may be about 1310 nm. CWDM systems may be particularly useful for short-reach applications (e.g., on the order of tens or hundreds of meters, such as within a data center). Although not specifically noted in the following, optical signal propagation is largely confined to optical waveguides such as optical fibers, silica-on-silicon waveguides, or waveguides in GaAs, InGaAs or other materials. "Fiber link" refers to a length of optical fiber that couples a transmitter and a receiver that are not located at the same place. Optical signals at different wavelengths define different wavelength channels, and "channel" is used in some examples to denote a modulated optical signal that is to be transmitted either on a dedicated optical fiber or combined by wavelength division multiplexing for communication on a fiber with other channels. While channels are associated with a specific wavelength such as a center wavelengths, the associated optical beams also have spectral widths selected to control channel overlap. Typically, an optical beam associated with a particular wavelength can be modulated, transmitted, and detected independently of other wavelengths in a multi-channel beam.

For convenient description, modulated optical data signals based on a single data transmitter and propagating on a dedicated optical fiber are referred to as parallel signals and the associated fibers are referred to as parallel or parallel communication optical fibers. Modulated optical data signals based on data transmitters associated with a plurality of distinct wavelengths (such as DWDM and CWDM wavelengths) and propagating on a dedicated optical fiber are referred to as wavelength multiplexed signals and the associated fiber is referred to as a muxed or serial communication optical fiber. This description of optical fibers is for convenient explanation, and typically, all optical fibers are of the same design. Modulated optical data signals are generally associated with data from a plurality of independent data sources that is modulated onto a common optical beam. Various approaches can be used to combine such multiple data signals and such approaches are commonly used in data centers. In some examples, only a single wavelength channel is used in wavelength multiplexing, but generally two or more channels are used or made available for use.

In typical implementations, optical receivers are wideband and lasers that are tuned to the CWDM grid or have other tunings can be routed to the separate fibers. In some disclosed examples, external modulation is used instead of direct laser modulation, and optical beam inputs are switched on an input side so that various specific-frequency lasers are coupled to be modulated by a selected data source as needed. Lasers can be arranged to operate at fixed frequencies, or be tunable.

Laser diodes are generally used to provide suitable optical beams or modulated optical beams. In some cases, modulated optical beams are provided using optical modulators such as electro-optical modulators (using InP or other materials) instead of or in addition to direct modulation of laser diodes. Silicon-based modulators can be used such as those based on phase modulation responsive to changes in carrier concentrations. For example, changes in carrier concentrations can be used to modulate optical beams coupled to a ring resonator defined in silicon. Other modulators are based on phase changes combined with Mach Zehnder interferometers. Combinations of direct modulation and external modulation can be used. Optical switches can similarly use electro-optical or silicon devices, as well as microelectromechanical systems (MEMs). Liquid crystal on silicon (LCOS) devices can be used as switches or modulators. While optical fibers can be used to interconnect optical switches, waveguides in silicon or other substrates can be used.

While the disclosed methods and apparatus can be used in a variety of optical communication systems, in one example, the disclosed approaches can be used in data center communications with interconnection lengths that are generally less than 120 km, but shorter or longer lengths can be used. The disclosed methods, apparatus, and systems can be used with other modulation formats and other optical fiber communication systems, including coherent communication systems. If needed, one or more fibers and/or lasers can be provided for use as a local oscillator for detection of coherent optical signals.

Optical devices that combine optical signal inputs at a plurality of wavelengths so as to propagate on a single fiber are referred to herein as multiplexers or optical multiplexers. These optical multiplexers also divide combined multi-wavelength beams into individual, separate modulated optical beams and can alternatively be referred to as demultiplexers. Such muxes (demuxes) can include thin film optical filters that selectively direct different wavelengths or one or more optical fibers that are fused to combine or separate optical signals at different wavelengths. Modulated optical beams are occasionally referred to as optical signals. In addition, in some illustrated examples, communication systems that include transceivers are shown for convenient illustration, instead of showing transmitters and receivers independently. In some examples, components are referred to a receiver components, receive-side components, transmitter components, or transmitter-side components. For example, an optical switch can be referred to as a receiver optical switch or a transmitter optical switch.

Referring to FIG. 1, a representative communication system 100 includes an optical transmitter 102 that is coupled to an optical receiver 152 with parallel optical fibers 140 and a wavelength multiplexed optical fiber 142. As shown in FIG. 1, the transmitter 102 receives input data from an application specific integrated circuit (ASIC) 104 that is coupled to receive one or more electrical data signals and allocate the received data to individual laser diode drive circuits of a set of laser drivers 106. Input data can be processed so that data is prepared for optical communication and allocated to one or more laser diodes 110-113 as may be convenient.

In FIG. 1, four laser diodes are used, but in other examples, more or fewer are used, and four laser diodes are shown for convenient explanation. Typically, the laser diodes 110-113 are coupled to optical fibers that are coupled to a first optical switch 120. For convenient fabrication, the laser diodes 110-113 are coupled to the optical switch using optical fiber connectors 108 such as LC connectors. Use of the connectors 108 permits relatively simple replacement of laser diodes or replacement of the optical switch 120 as may be needed to reconfigure the allocation of laser diodes 110-113 to output fibers as discussed in detail below.

The optical switch 120 is optically coupled to a wavelength division multiplexer ("wavelength mux") 122 via optical fibers 124 and to the parallel output optical fibers 140. In some examples, the switch 120 is reconfigurable and associated drive and control circuitry is indicated generally as switch control 121. For example, assignment of any of the laser diodes 110-113 to any of the optical fibers 140, 142 can be fixed by the optical switch 120, or the optical switch can be reconfigurable so that such assignments can be varied as required. Optical switches in which are reconfigurable are referred to herein as "active switches" and optical switches that are fixed are referred as "passive switches" for convenience. With a passive optical switch, optical switch replacement is typically required to select different data allocations to optical fibers. In the example of FIG. 1, the parallel fibers 140 are shown as communication optical signals according to the 100G PSM4 MSA standard in which four optical fibers are used for four independent optical data signals and the wavelength mux fiber 140 is indicated as propagating optical signals associated with coarse wavelength division multiplexed (CWDM). This arrangement is selected to facilitate explanation, but other standards and optical signals can be used. For example, standards such as 100G CWDM4 or 100G CLR4 MSA or other standards can be used.

The optical receiver 152 includes a wavelength demux 172 that is coupled to the wavelength mux fiber 142 so as to separate wavelength muxed optical signals and couple individual optical signals to an optical switch 170, typically via optical fibers 174. The optical fibers 174 (and the corresponding optical fibers 124 of the transmitter 102) are generally coupled using fiber optic connectors to permit replacement of muxes, demuxes, switches, and other components. Such replacements permit different assignments of laser diodes and photodetectors to the fibers 140, 142. The demuxed optical signals are coupled to the optical switch 170 along with optical signals received from the fibers 140. The optical switch 170 selectively directs the received optical signals to detectors 160-163 that are then coupled to amplifiers such as transimpedance amplifiers 156. The corresponding electrical signals are coupled to a switch ASIC 154 that processes the electrical signals so that the associated data signals are provided. The optical switch 170 can be fixed or reconfigurable, and control and switching circuitry are shown generally as a switch control 171.

In the example of FIG. 1, the fibers 140, 142 couple the transmitter 102 and the receiver 152, but in other examples, some or all the fibers 140, 142 are coupled to additional receivers and transmitters. For example, the muxed fiber 142 can be coupled to a remote receiver (not shown) while the parallel fibers 140 remain coupled to the receiver 152. In addition, fewer or more parallel or muxed signals can be used, and four parallel fibers and one muxed fiber serve as a convenient example.

Figure 2:
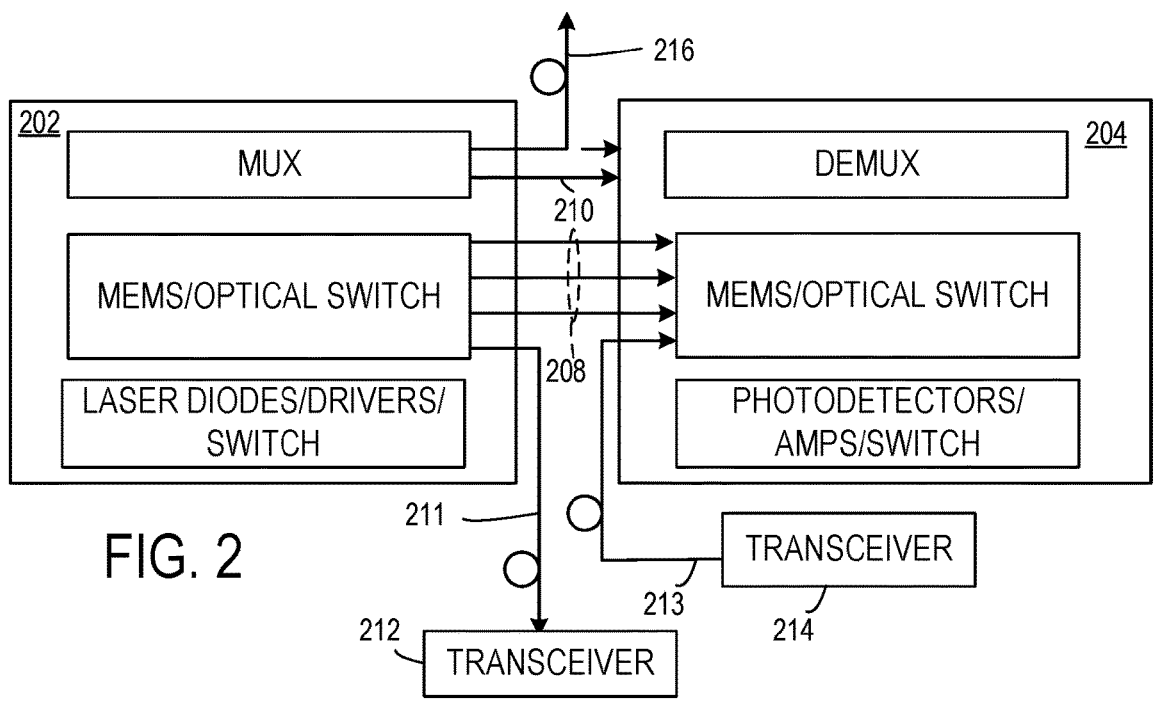
FIG. 2 illustrates a representative optical transmitter and a representative optical receiver that selectively transmit or receive optical data as individual channel data or as wavelength multiplexed channel data to and from one or more additional optical transmitters and optical receivers.

FIG. 2 illustrates an optical transmitter 202 that is optically coupled via parallel fibers 208 and a wavelength mux fiber 210 to an optical receiver 204. The transmitter 202 is also optically coupled via a parallel fiber 211 to an optical transceiver 212 and a wavelength mux fiber 216 is coupled to an additional transceiver (not shown). Similarly, the receiver 204 is optically coupled via a parallel fiber 213 to receive optical signals from a transceiver 214. Other arrangements can be used, and FIG. 2 is provided to illustrate a representative allocation of optical fibers.

Figure 3:
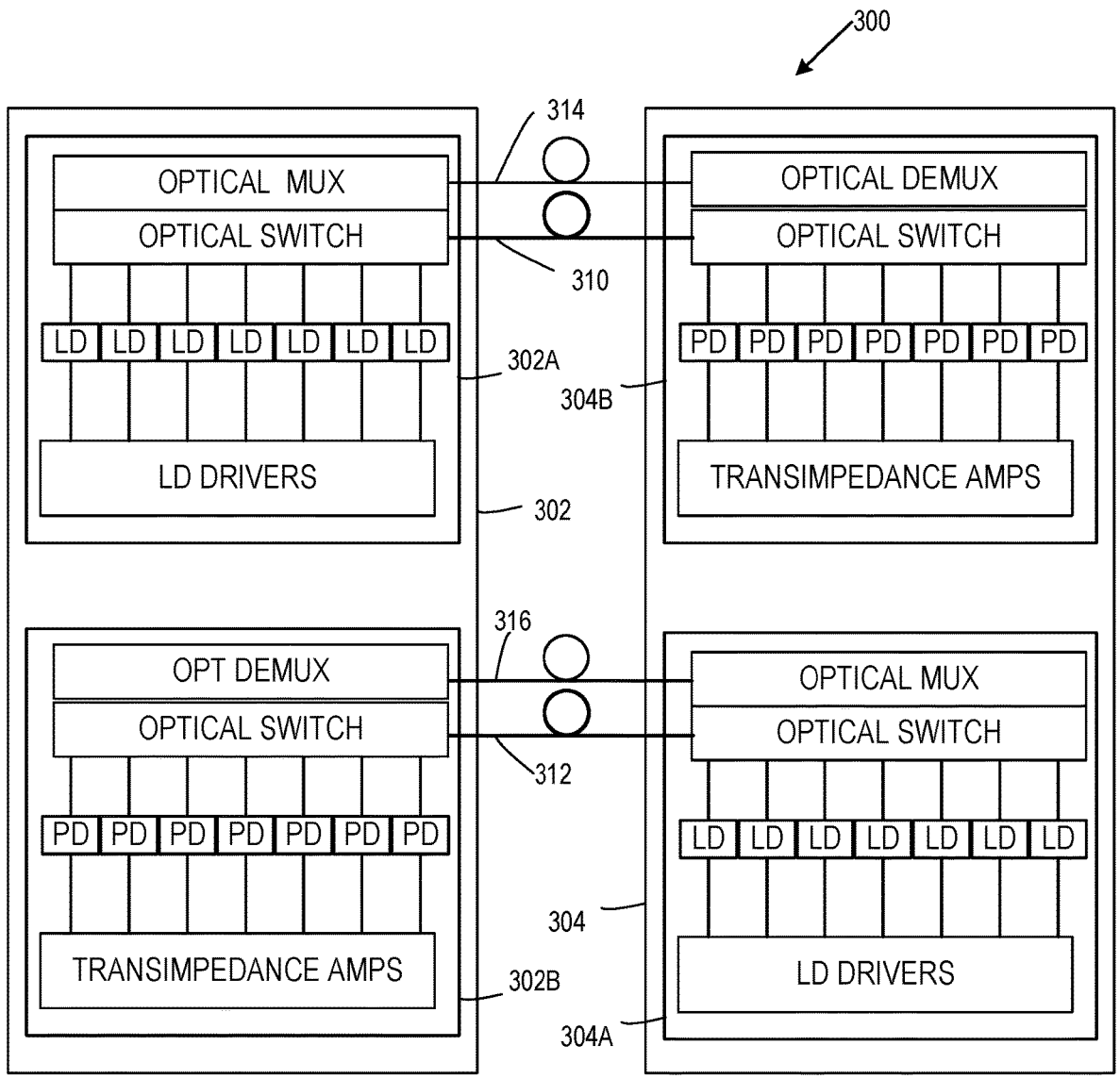
FIG. 3 illustrates representative optical transceivers communicating via a plurality of optical fibers with data selectively allocated for wavelength division multiplexing or demultiplexing.

Referring to FIG. 3, a representative optical communication system 300 includes transceivers 302, 304 that include respective transmitters 302A, 304A and respective optical receivers 302B, 304B. As shown in FIG. 3, the transceivers 302, 304 are optically coupled with sets 310, 312 of parallel optical fibers and wavelength mux fibers 314, 316. In some examples, one or more network nodes can be provided with optical receivers or optical transmitters, but generally both are provide to permit data transmission and reception.

Figure 4:
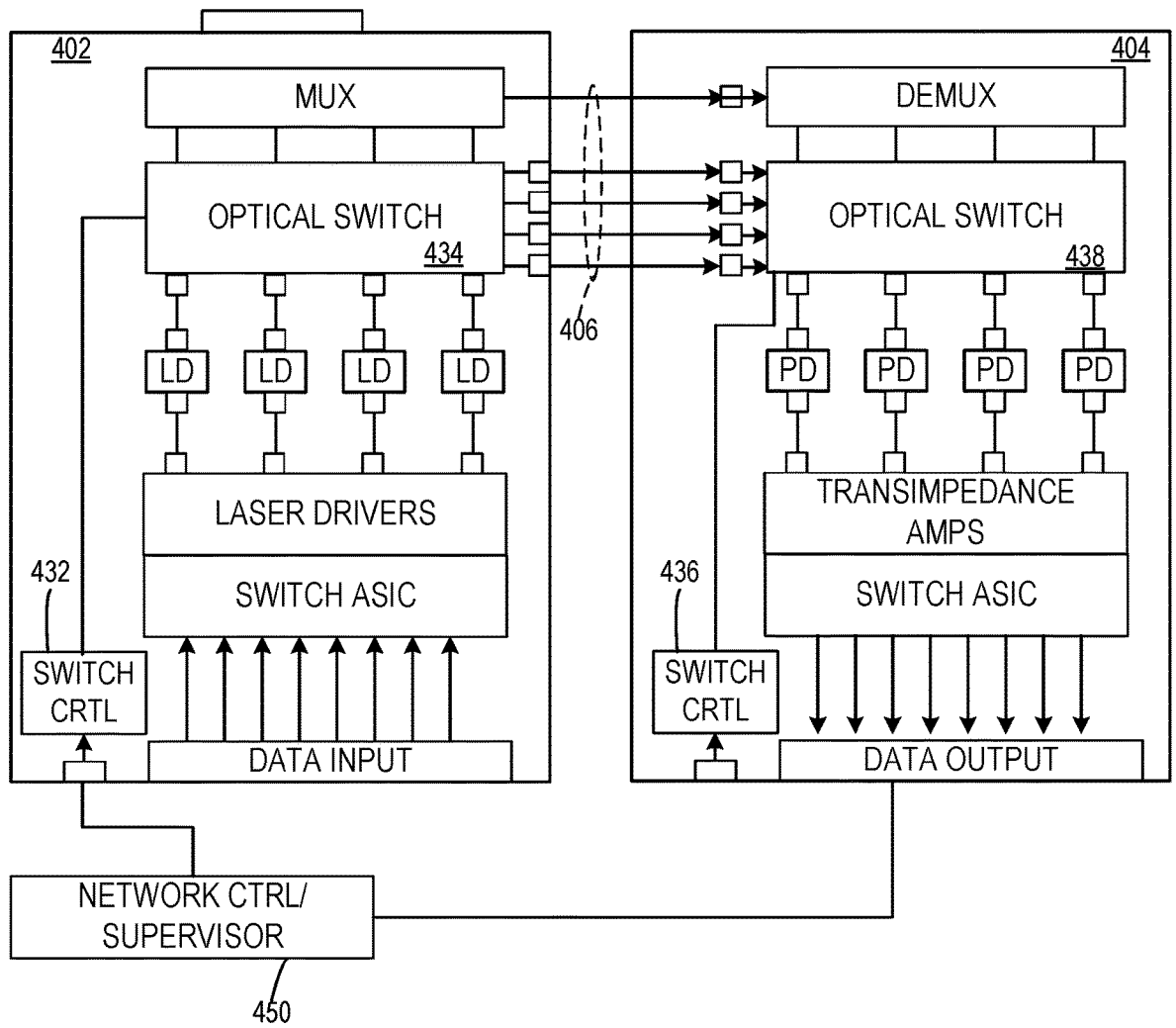
FIG. 4 illustrates a portion of a representative optical communication system in which a network controller or other supervisory node is coupled to transmitter and receiver optical switches for data allocation to one or more optical fibers.

With reference to FIG. 4, an optical transmitter 402 is optically coupled to an optical receiver 404 via optical fibers 406 that include fibers associated with parallel channels and wavelength muxed channels. While the optical transmitter 402 is similar to those shown above, the optical transmitter 402 includes a switch control component 432 that is coupled to an associated optical switch 434. The optical receiver 404 includes a switch control component 436 that is coupled to an associated optical switch 438. A network controller 450 is coupled via the switch controllers 432, 436 so that channel switching by the optical switches 434, 438 can be changed.

Figure 5A:
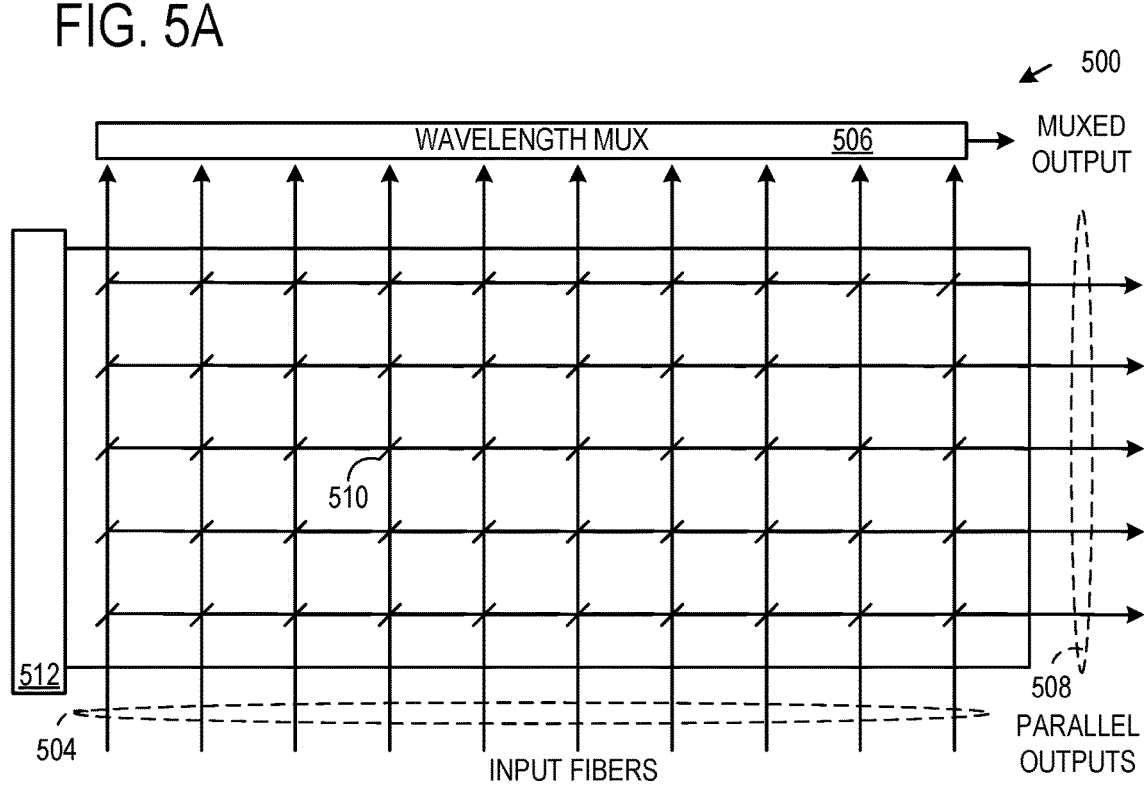
FIGS. 5A-5B illustrate configuration of a representative active optical switch for data allocation.
Figure 5B:
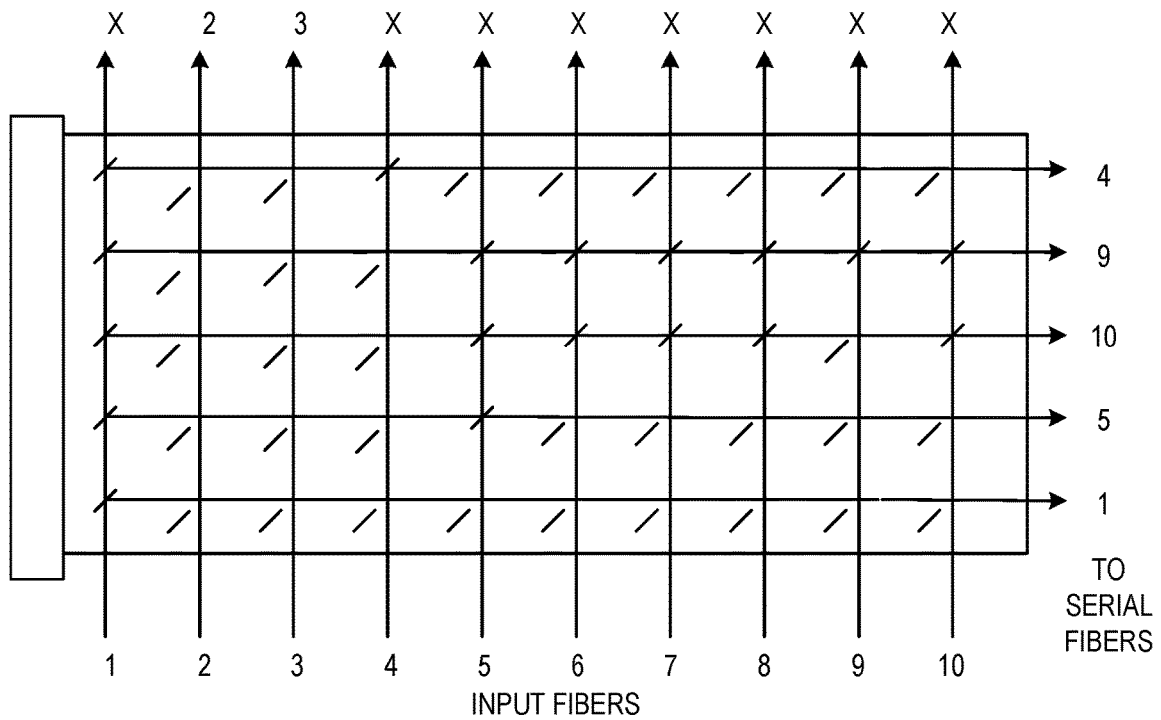

FIGS. 5A-5B illustrate a representative optical switch 500. As shown in FIG. 5A, the switch 500 is situated so as to selective couple optical fibers from a set 504 of optical fibers to a wavelength mux 506 or to one or more optical fibers from a set of optical fibers 508. The optical switch 500 includes a plurality of reflectors such as representative reflector 510 and control circuitry 512 coupled to the plurality of reflectors so as to produce reflector displacements. In other examples, reflector-based switches include tiltable reflectors that direct beams by controlling reflector tilt angles. Other optical switch types can be used, and the optical switch 500 is used for illustration. It should also be noted, that in FIG. 5A, signals to be wavelength muxed can propagate straight through the switch 500 and parallel channel signals are reflected, but this arrangement can be reversed. In addition, wavelength muxed channels can be reflected at one or more reflectors so as to exit a selected output port for coupling to the wavelength mux 502 as preferred and need not propagate straight through the switch 500.

As shown in FIG. 5B, input optical fibers labelled 1-10 are coupled to respective output optical fibers with reflectors displaced as needed. Optical fibers 1, 4, 5, 9, 10 are coupled so as to output to serial output fibers of the set 508 while input fibers 2 and 3 are coupled to the wavelength mux 502. Unused switch outputs are marked as "X" but it will be appreciated that depending on how the reflectors are situated, any of the wavelength mux output fibers or the parallel output fibers can receive an optical signal.

Figure 6:
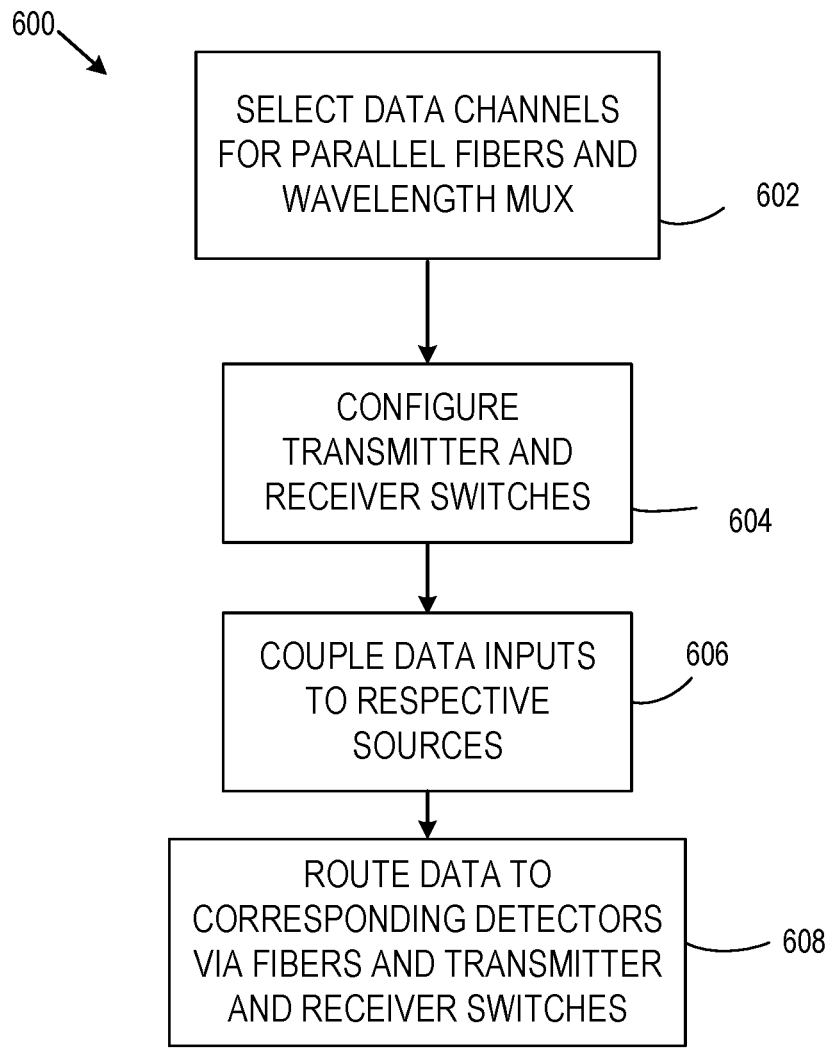
FIG. 6 illustrates a representative communication method based on selective allocation of data for wavelength division multiplexing.

Referring to FIG. 6, a method 600 of operating a network controller (or other programmable network device) such as illustrated in FIG. 4 includes selecting data channels to be communicated via parallel optical fibers and data channels to be wavelength multiplexed on one or more optical fibers at 602. At 604, transmitter and receiver optical switches are configured based on the selection. In some examples, optical switches at a plurality of transmitters and receivers must be configured as each transmitter or receiver can be coupled to numerous other receivers and transmitters, respectively. In other examples, only optical switches associated with first and second transceivers need to be configured. Switch configuration can be accomplished by providing a passive switch or by selective activation of active switch elements such as reflectors. If passive optical switches are used, switch replacement may be needed to reconfigure an optical transmitter or an optical receiver. It may be convenient to terminate connecting optical fibers within a transceiver with fiber optic connectors instead of fusion or other types of fiber splicing to simplify switch replacement, especially if different channel allocations are anticipated. At 606, data inputs/outputs are coupled to respective data sources/sinks, and at 608, received data is routed to one or more detectors based using one or more receiver-side switches, and transmitted data is routed to corresponding fibers based on one or more transmitter side switches.

Figure 7:
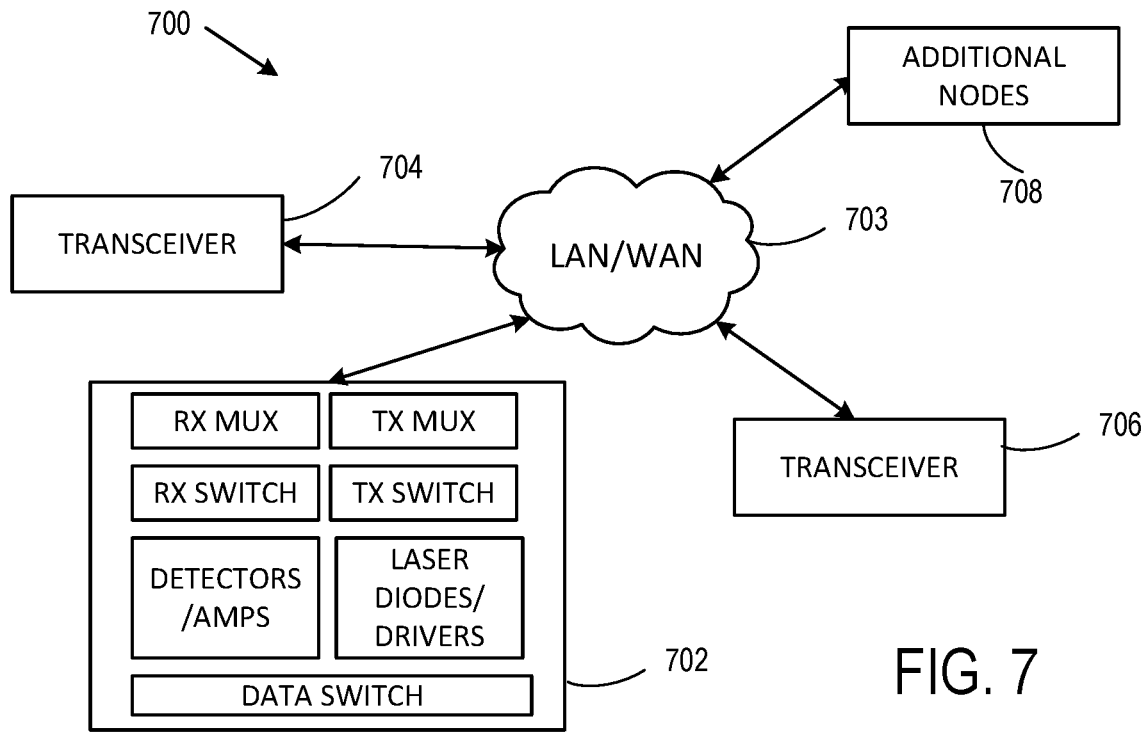
FIG. 7 illustrates a communication network that includes optical transmitters and receivers as illustrated in FIG. 1.

With reference to FIG. 7, a communication system 700 includes an optical transceiver 702 coupled to a local area network or a wide area network, shown generally in FIG. 7 as a cloud 703. The transceiver 702 is shown as a switch-configurable transceiver as discussed above, in which data is selectively allocated to individual (parallel) optical fibers or wavelength multiplexed to an associated optical fiber. Additional transceivers 704, 706 are also coupled to the network 703, and can be similar to the transceiver 702. The transceivers 704, 706 can communicate with the transceiver 702, with each other, or with additional network nodes 708.

Figure 8:
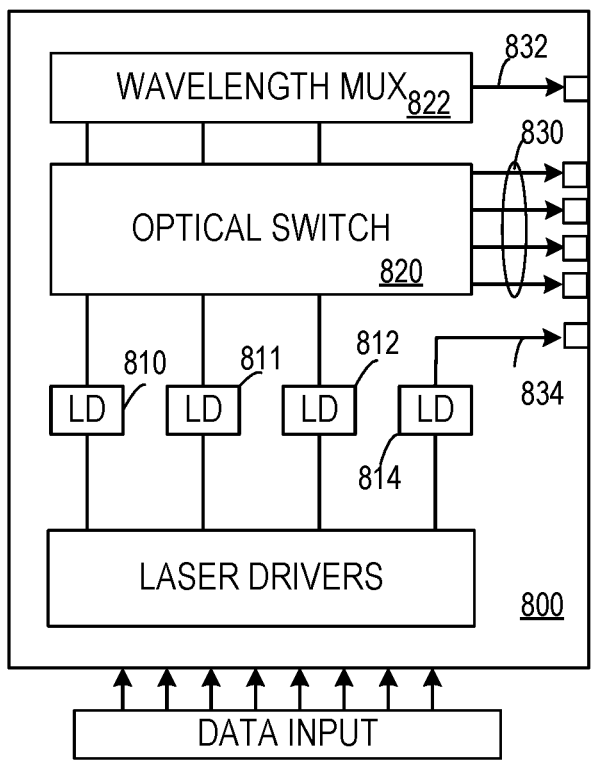
FIG. 8 illustrates a representative optical transmitter that selectively transmits optical data as individual channel data or as wavelength multiplexed channel data and that includes an optical fiber that is unswitched.

FIG. 8 illustrates an optical transmitter 800 that is arranged so that an optical switch 820 selectively allocates optical signals from laser diodes 810-812 to parallel output fibers 830 and to a wavelength multiplexer 822. An optical fiber 832 is coupled to the wavelength multiplexer 822 so as to receive optically multiplexed signals (such as DWDM or CWDM signals). In addition, one or more optical fibers such as optical fiber 834 is coupled to laser diode 814 but is unswitched. Such a fiber can be dedicated to a particular data channel or network node, or can be used as a supervisory channel for communication of switch and wavelength multiplexer settings.

Optical switches can use displaceable or tiltable reflectors based on silicon micro-machining, electro-optic and acousto-optic materials, liquid crystals (such as liquid crystal on silicon) or other devices including diffractive elements. In addition, while the examples are described with reference to laser diodes, other optical sources such as LEDs or other types of lasers can be used. As noted above, optical switch replacement can be used in channel reconfiguration. For this reason, optical switches can be optically coupled with connectors instead of optical splicing such as fusion splicing, and optical switches are removably secured to a transceiver substrate. In some examples, one or more of laser diodes, photodetectors, muxes, and demuxes are fixed to a substrate with an adhesive, soldering, or other relatively permanent fastening method, while the optical switches are removably secured with springs, screws, clips, or an elastic member for convenient replacement. Optical switches can be coupled to processing devices such as microprocessors, ASICs, FPGAs, or other computing devices that are configured to execute instructions that configure the optical switches to appropriately route and multiplex/demultiplex optical signals. In some examples, the processing devices are coupled to one or more interdigitated electrodes, transistors, transparent conductive coatings, or other switch components. Instructions can be stored in RAM, ROM, or other tangible storage media or storage devices.

Figure 9:
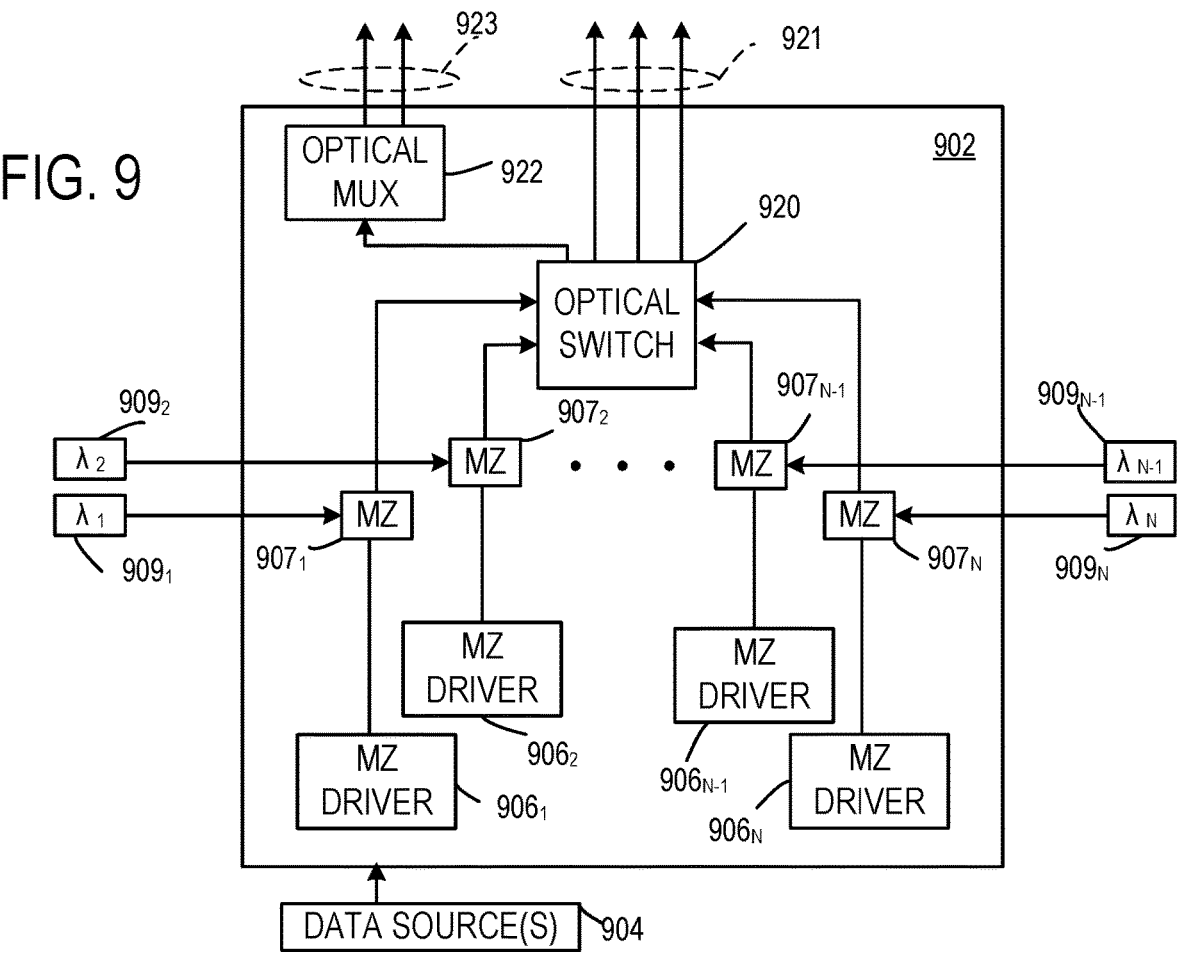
FIG. 9 illustrates a representative optical transmitter in which optical modulators are used to modulate optical beams received from laser diodes.

FIG. 9 illustrates a representative transmitter 902 that is coupled to one or more data sources 904 that couple data to be transmitted to Mach-Zehnder (MZ) modulator drivers $906_1$-$906_N$ so that optical beams from external lasers $909_1$-$909_N$ are modulated by respective MZ waveguide optical modulators $907_1$-$907_N$. Modulated optical beams are coupled to an optical switch 920, and one or more modulated optical beams can be coupled to an optical multiplexer 922 for output as one or more wavelength multiplexed (combined) optical beams on one or more optical fibers 923. Other modulated optical beams are directed by the optical switch 920 to individual (parallel) fibers 921. The external lasers $909_1$-$909_N$ can provide optical beams at one or more wavelengths, some of which can be the same or different. In some cases, selected wavelengths correspond to standard CWDM or DWDM channels.

Figure 10:
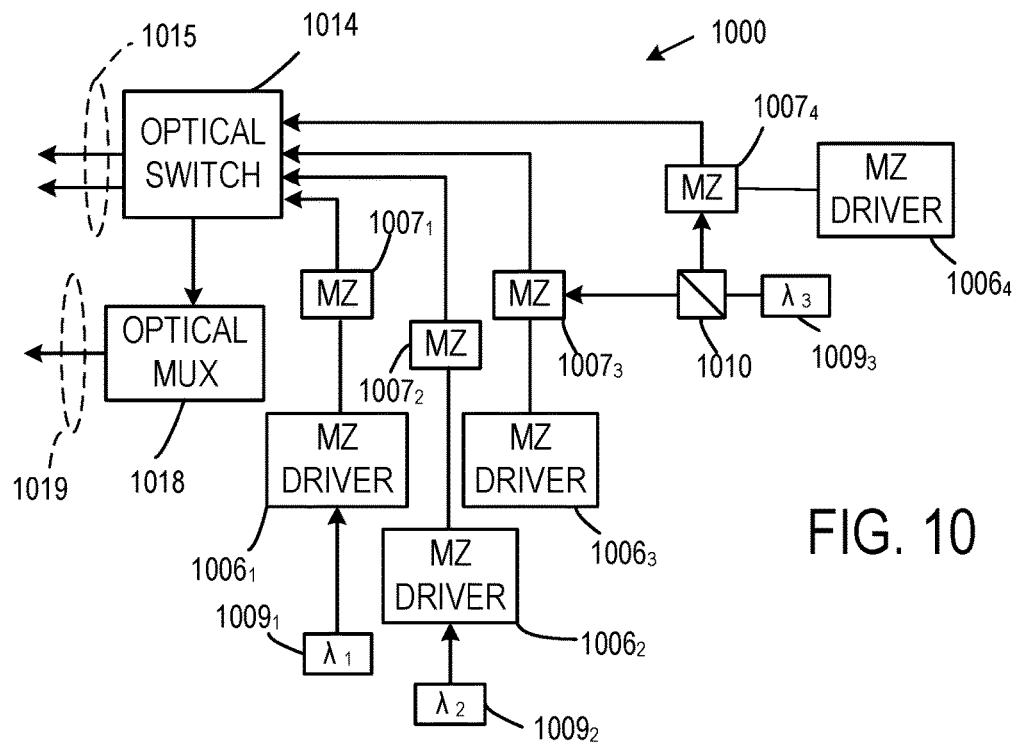
FIG. 10 illustrates a representative optical transmitter in which portions of an optical beam from at least one laser diode are coupled to different optical modulators.

FIG. 10 illustrates another representative transmitter 1000 that includes MZ modulator drivers $1006_1$-$1006_4$. Optical beams from external lasers $1009_1$, $1009_2$ are modulated by respective MZ waveguide optical modulators $1007_1$, $1007_2$. Modulated optical beams are coupled to an optical switch 1014, and one or more modulated optical beams can be coupled to an optical multiplexer 1018 for output as one or more wavelength multiplexed (combined) optical beams on one or more optical fibers 1019. Other modulated optical beams are directed by the optical switch 1014 to individual (parallel) fibers 1015. As shown in FIG. 10, an optical beam from the external laser $1009_3$ is divided into two portions by a beam splitter 1010 and are then coupled to MZ modulators $1007_3$, $1007_4$ that are coupled to MZ modulator drivers $1006_3$, $1006_4$ so that a single external laser can be used for multiple channels. The beam splitter 1010 can be implemented as a cube beam splitter or a fiber coupler or fiber beam splitter or other beam splitter as is convenient. In other examples, additional optical beams are divided into one, two, three, or more portions that can be independently modulated. While FIGS. 9-10 show modulated beams produced using MZ or other modulators, in some examples, one or more modulated beams is produced by direct laser diode modulation.

Figure 11:
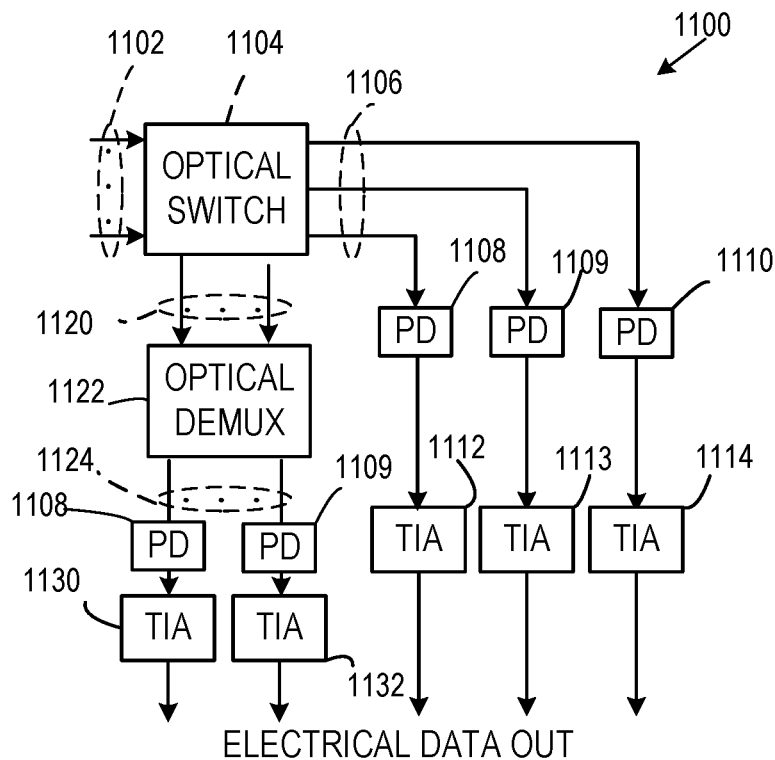
FIG. 11 illustrates a representative optical receiver that includes an optical switch situated to selectively route received optical signals directly to photodiodes, or to route one or more input optical signals to an optical demultiplexer and then to corresponding photodiodes.

FIG. 11 illustrates a representative optical receiver 1100 having input optical fibers 1102 that are coupled to an optical switch 1104 that directs selected input optical beams via optical fibers or other waveguides 1106 to photodiodes 1108-1110 that are coupled to respective transimpedance amplifiers (TIAs) 1112-1114. The optical switch 1104 couples other input optical beams via optical fibers or other waveguides 1120 to an optical demux 1122 that directs demultiplexed optical beams to optical fibers 1124 and to photodiodes 1108, 1009 that are turn coupled to TIAs 1130, 1132. In such an arrangement, any of the input fibers 1102 can be used for parallel or WDM optical beams.

Figure 12:
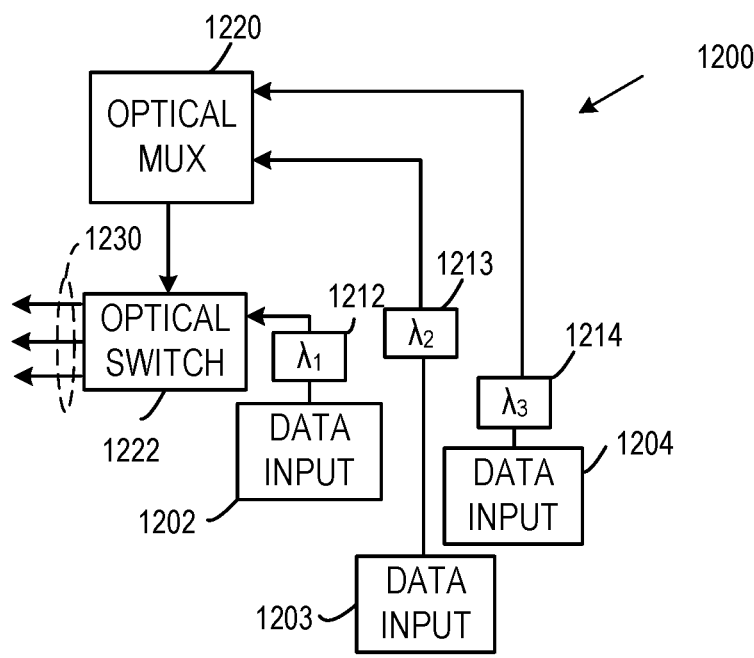
FIGS. 12-13 illustrate additional representative optical transmitters.

FIG. 12 illustrates a representative transmitter 1200 having directly or externally modulated sources 1213, 1214 that deliver modulated optical beams to an optical multiplexer 1220 in response to data inputs 1203, 1204, respectively. One or more multiplexed optical beams is coupled to an optical switch 1222. A modulated optical beam source 1212 couples a modulated optical beam associated with a data input 1202 to the optical switch 1222. The optical switch 1222 selectively couples parallel beams and/or wavelength multiplexed beams to any of one or more output optical fibers 1230.

Figure 13:
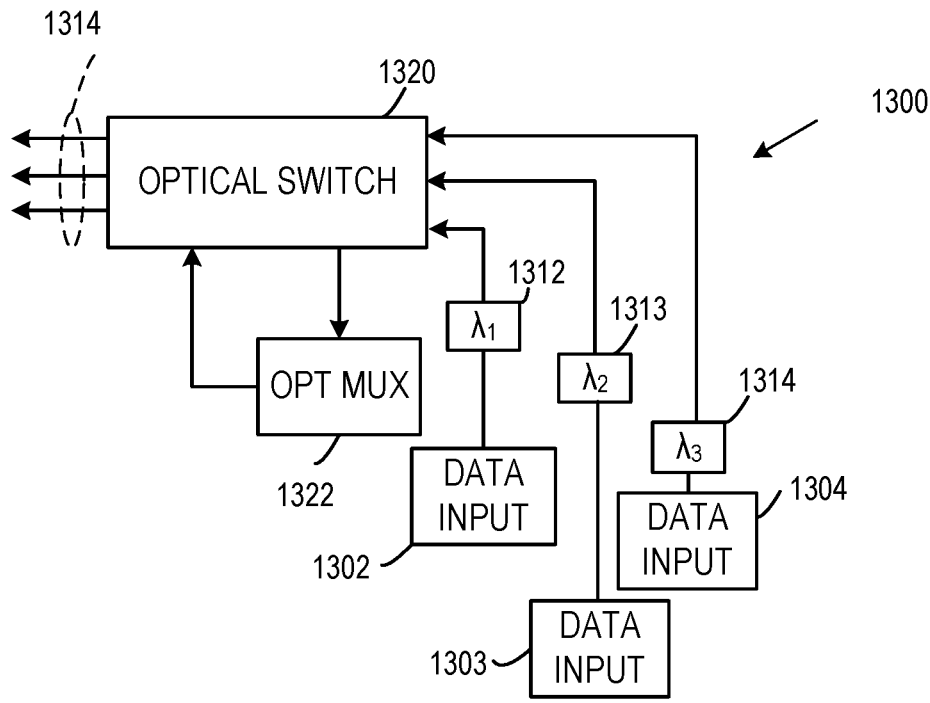

FIG. 13 illustrates a transmitter 1300 that includes modulatable optical beam sources 1312-1314 that are coupled to respective data sources 1302-1304 and produce modulated optical beams that are coupled to an optical switch 1320. An optical multiplexer 1322 receives selected modulated optical beams from the optical switch 1320 and couples one or more wavelength multiplexed beams back to the optical switch 1320. The optical switch 1320 couples parallel or multiplexed modulated optical beams to any one or more optical fibers of a group 1314 of output optical fibers 1314.

Figure 14:
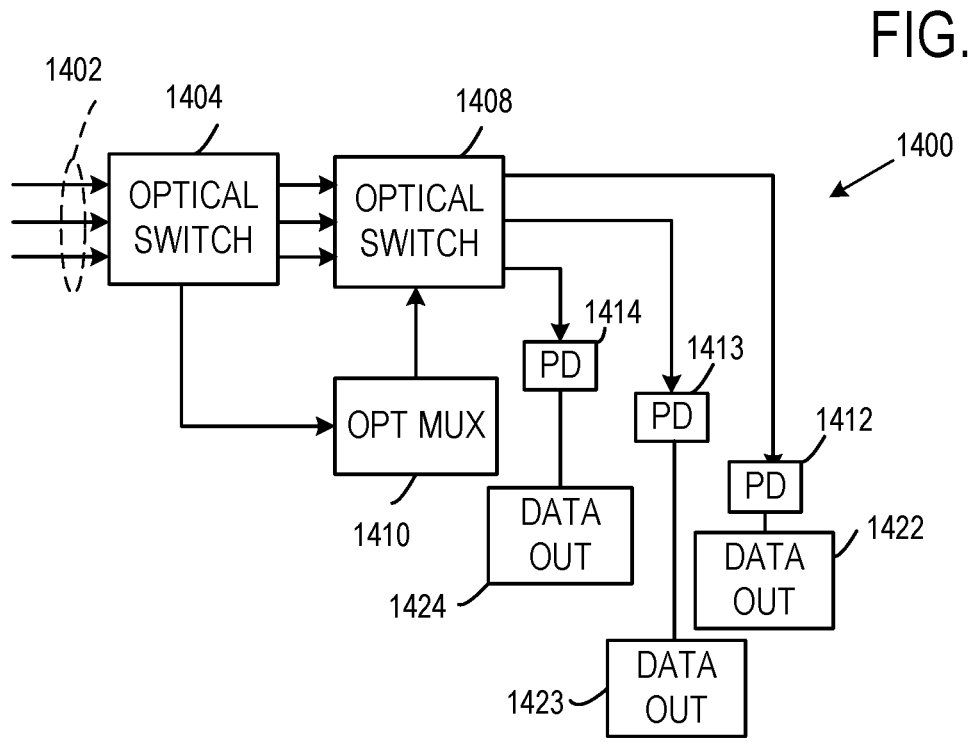
FIG. 14 illustrates a representative optical receiver that includes two optical switches and permits arbitrary mappings of optical inputs to photodetectors.

FIG. 14 illustrates a receiver 1400 that includes a first optical switch 1404 that couples selected input optical fibers of a group 1402 to an optical multiplexer ("mux") 1410 and/or to a second optical switch 1408. The mux 1410 separates combined modulated optical beams received from selected optical fibers and delivers separated modulated optical beams to the second switch 1408. Photodetectors 1412-1414 are optically coupled to the second switch 1408 and electrically coupled to respective data outputs 1422-1424. With such an arrangement, any input optical fiber of the group 1402 can be coupled to any available photodetector.

Figure 15:
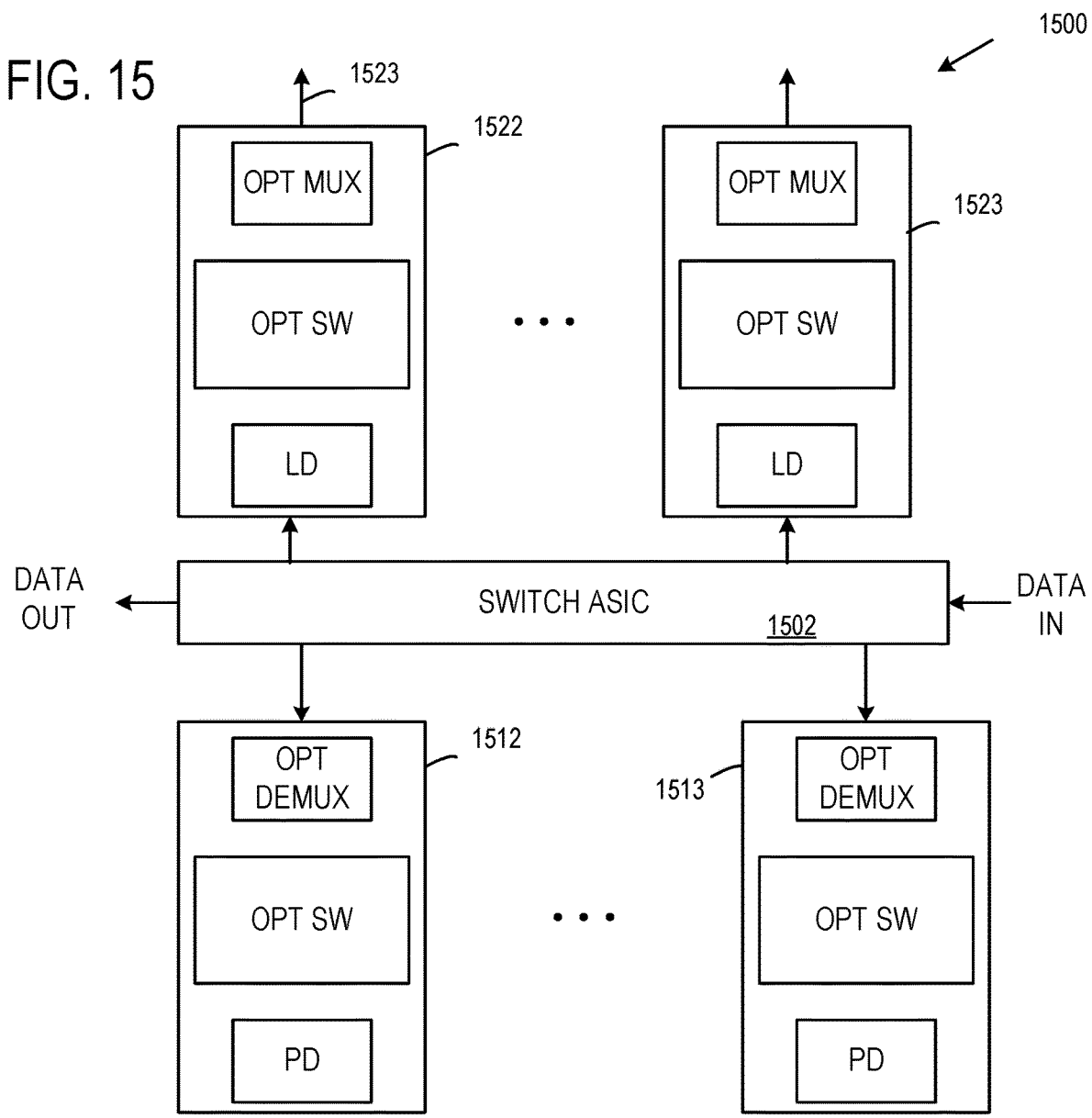
FIG. 15 illustrates a portion of a representative optical communication system.

FIG. 15 illustrates an optical communication system 1500 that includes representative receivers 1512, 1513 coupled to receive electrical data from a switch ASIC 1502. Transmitters 1523, 1524, are coupled to the switch ASIC 1502 to receive data to be transmitted. Each of the receivers 1512, 1513 can include one or more optical switches, optical muxes, and photodetectors. Each of the transmitters 1523, 1524 can include one or more optical switches, optical muxes, and laser diodes (or optical modulators).

Figure 16:
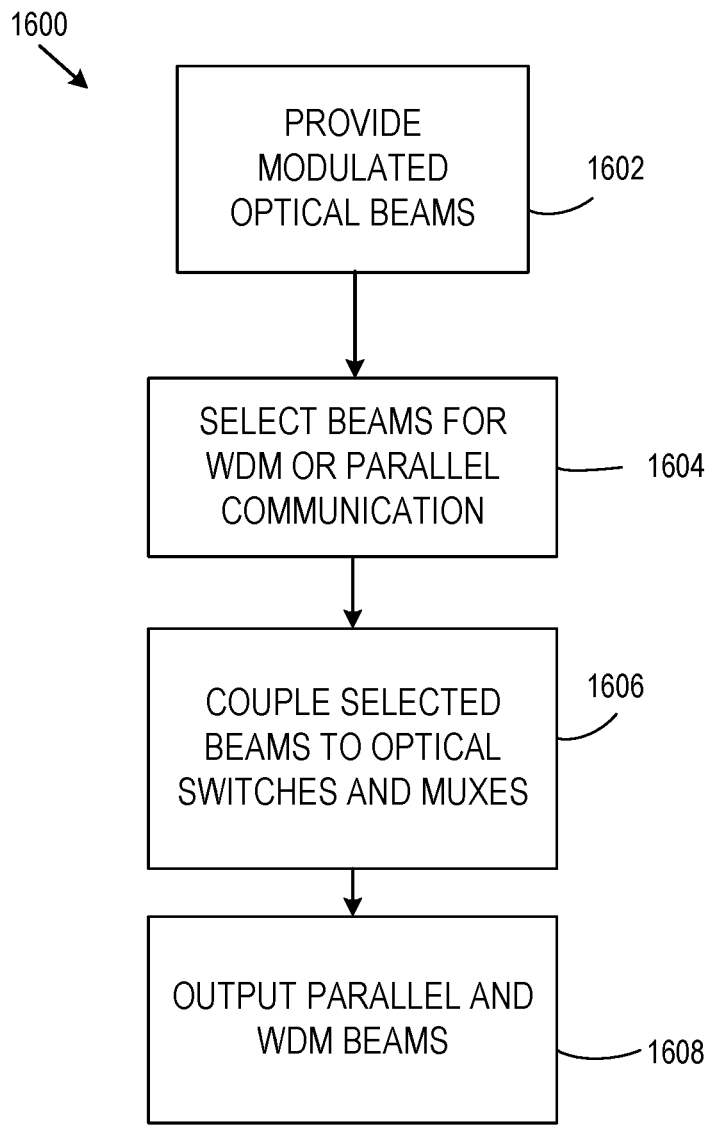
FIG. 16 illustrates a representative method of optical communication.

In one example, flexible channel allocation as directed by a network controller (or other network control device such as an optical switch controller) is provided according to a representative method 1600 shown in FIG. 16. At 1602 modulated optical beams are received and at 1604, one or more modulated optical beams are selected for WDM or parallel communication. At 1606, the selected beams are coupled to optical switches and multiplexers so that parallel and WDM combined beams are output at 1608.

Figure 17:
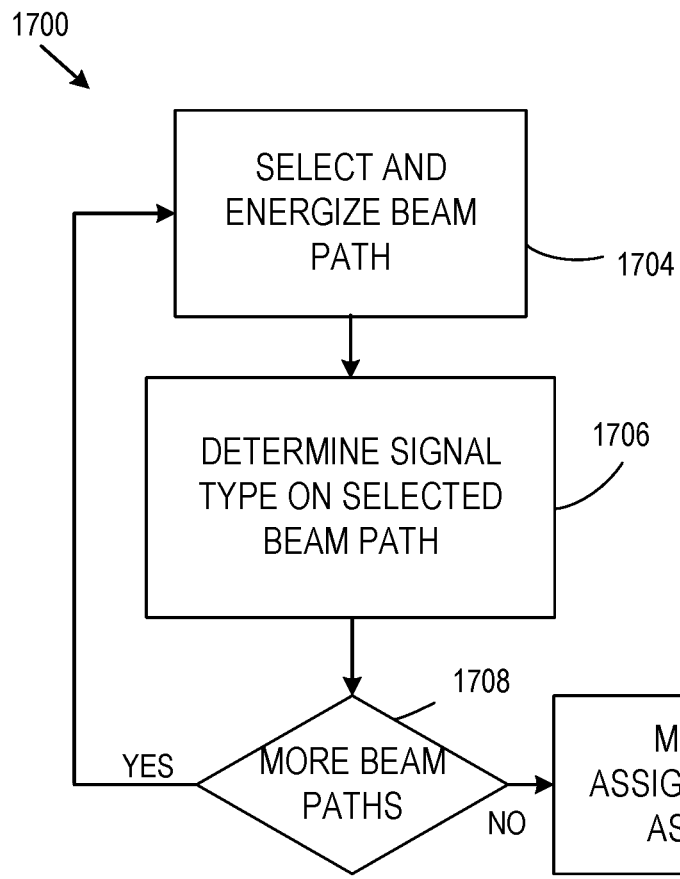
FIG. 17 illustrates method of establishing optical signal types for configuring optical switches.

As shown in FIG. 17, a configuration of parallel and WDM channels can be determined by a network controller (and/or other network control devices such as one or more optical switch controllers) using a method 1700. At 1704 a beam path is selected and associated optical beams are energized. At 1706, one or more received beams are detected, and an optical signal type along the selected beam path is determined. This determination can be based on, for example, stored assignments retrieved from a memory or by assessing error rates in a received optical signal. At 1708, it is determined if additional beam paths are to be used, and if so, an additional beam path is energized at 1704. This process repeats until all beam paths have been characterized and path assignments stored at 1710. Such path assignments are then available for configuring optical switches. With the method 1700 of FIG. 17, path assignments be determined without additional user or network administrator input.

Figure 18:
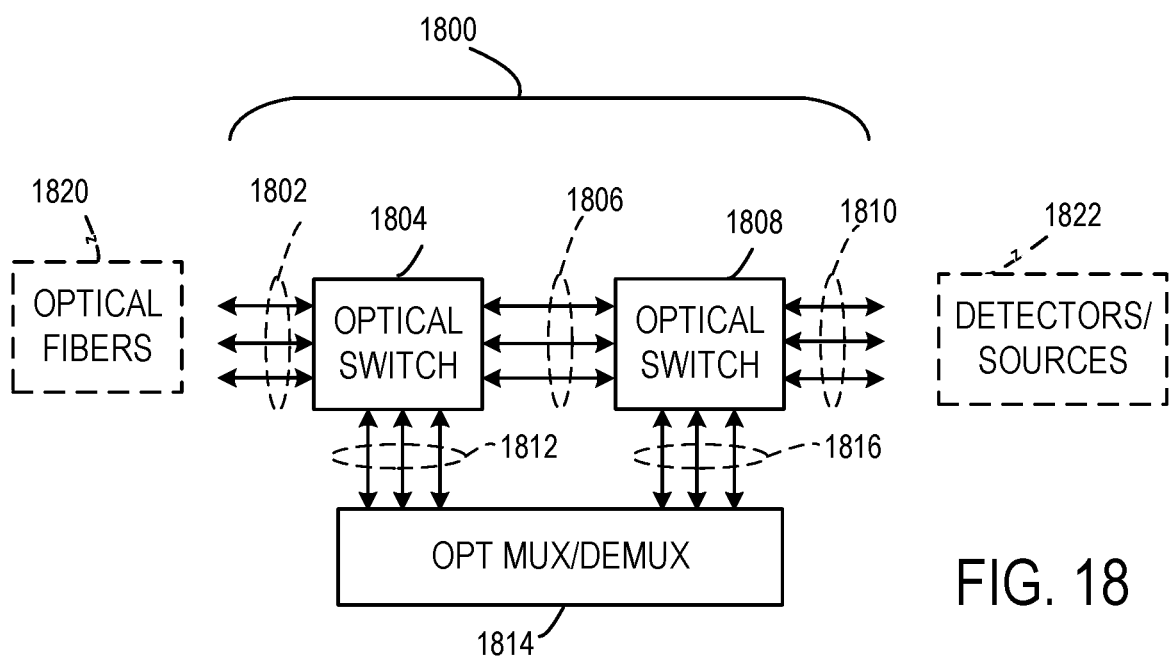
FIG. 18 illustrates a representative optical switch assembly.

FIG. 18 illustrates a switch assembly 1800 that includes a group 1802 of fibers or other optical waveguides that is coupled to a first optical switch 1804 that is configurable to optically connect one or more of the optical waveguides of the group 1802 to selected optical waveguides (such as optical fibers or silicon waveguides) of a group 1806. A second optical switch 1808 is coupled to the group 1806 and is configurable to couple selected waveguide(s) of the group 1806 to one or more waveguides of a group 1810. In addition, the first optical switch 1804 is configurable to couple waveguides of the group 1802 to an optical mux/demux 1814 that in turn is coupled to the second optical switch 1808 with one or more waveguides of a group 1816. As illustrated, the first optical switch 1804 is coupled to receive or transmit modulated optical signals propagating on one or more optical fibers 1820 and the second optical switch 1808 is coupled to one or more photodetectors, lasers, optical modulators, or a combination thereof as shown generally as 1822. In some cases, one or more waveguides coupled to the first optical switch 1804, the second optical switch 1808, or the optical mux/demux 1814 are directly routed to input/output fibers or sources/detectors. As shown in FIG. 18, all optical fibers 1820 are arbitrarily couplable to one or more detectors/sources, and can be selected for transmission or reception of a wavelength multiplexed optical signal. In other examples, some channels are not arbitrarily assignable, but may be coupled to a single switch and/or a multiplexer. The switch assembly 1800 can be implemented with discrete components using optical fibers, but integration using silicon or other waveguides on a single substrate can be convenient.

An optical communication method comprises coupling a plurality of data sources of a first set of data sources to respective laser diodes to produce corresponding output modulated optical signals; selecting a first plurality of the output modulated optical signals for parallel transmission; selecting a second plurality of the output modulated optical signals for wavelength division multiplexed transmission; directing the first plurality of output modulated optical signals and the second plurality of output modulated optical signals to a first optical switch, wherein the first optical switch directs each of the output modulated optical signals of the first plurality of output modulated optical signals to respective optical fibers, and directs the second plurality of output modulated optical signals to a wavelength division multiplexer; receiving the second plurality of output modulated optical signals at the wavelength division multiplexer from the first optical switch; combining, with the wavelength division multiplexer, the second plurality of the output modulated optical signals and coupling the combined second plurality of output modulated optical signals in an associated optical fiber; coupling a plurality of received modulated optical signals to a second optical switch; selecting a first plurality of the received modulated optical signals for coupling to respective detectors; selecting a second plurality of the received modulated optical signals for wavelength division demultiplexing; with the second optical switch, directing the first plurality of received modulated optical signals to the respective detectors and the second plurality of received modulated optical signals to a wavelength division multiplexer; at the wavelength division demultiplexer, separating the received modulated optical signals of the second plurality of received modulated optical signals based on respective wavelengths; and coupling the separated modulated optical signals to respective detectors.

An optical communication device comprising a first optical switch coupled to direct modulated optical signals of a first set of modulated optical signals to respective output optical fibers; an optical wavelength division multiplexer coupled to the first optical switch so as to combine modulated optical signals from a second set of modulated optical signals from the first optical switch and couple the combined modulated optical signals to a corresponding output optical fiber; a second optical switch coupled so as to receive modulated optical signals from a set of input optical fibers; and an optical wavelength division demultiplexer coupled to the second optical switch so as to separate wavelength division multiplexed optical signals from the received modulated optical signals.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

What is claimed is:

1. An optical communication method, comprising:
at an optical transmitter at a network node,
coupling a plurality of data sources of a first set of data sources to respective laser diodes to produce corresponding output modulated optical signals;
selecting a first plurality of the output modulated optical signals for parallel transmission;
selecting a second plurality of the output modulated optical signals for wavelength division multiplexed transmission;
directing the first plurality of output modulated optical signals and the second plurality of output modulated optical signals to a first optical switch, wherein the first optical switch directs each of the output modulated optical signals of the first plurality of output modulated optical signals to respective optical fibers, and directs the second plurality of output modulated optical signals to a wavelength division multiplexer;
receiving the second plurality of output modulated optical signals at the wavelength division multiplexer from the first optical switch; and
combining, with the wavelength division multiplexer, the second plurality of the output modulated optical signals and coupling the combined second plurality of output modulated optical signals in an associated optical fiber;
at an optical receiver in the network node,
coupling a plurality of received modulated optical signals to a second optical switch;
selecting a first plurality of the received modulated optical signals for coupling to respective detectors;
selecting a second plurality of the received modulated optical signals for wavelength division demultiplexing;
with the second optical switch, directing the first plurality of received modulated optical signals to the respective detectors and the second plurality of received modulated optical signals to a wavelength division demultiplexer;
at the wavelength division demultiplexer, separating the received modulated optical signals of the second plurality of received modulated optical signals based on respective wavelengths; and
coupling the separated modulated optical signals to respective detectors.

2. A network node for an optical communication network, comprising:
a transmitter that includes:
laser diodes coupled to respective data sources of a first set of data sources to produce corresponding output modulated optical signals;
a first optical switch situated to select a first plurality of the output modulated optical signals and a second plurality of the output modulated optical signals and direct each of the output modulated optical signals of the first plurality of the output modulated optical signals to respective optical fibers for parallel transmission; and
a wavelength division multiplexer situated to receive the second plurality of the output modulated optical signals from the first optical switch, combine the second plurality of modulated optical signals, and direct the combined second plurality of modulated optical signals to an associated optical fiber; and
an optical receiver that includes:
a second optical switch operable to select a first plurality of received modulated optical signals and a second plurality of received modulated optical signals and direct the first plurality of received modulated optical signals to respective detectors;
a wavelength division demultiplexer situated to receive the second plurality of received modulated optical signals and separate the received modulated optical signals of the second plurality of received modulated optical signals based on respective wavelengths; and
a plurality of optical detectors coupled to receive a respective separated modulated optical signal.

3. The network node of claim 2, further comprising a plurality of optical modulators situated to produce the first plurality of the output modulated optical signals and the second plurality of the output modulated optical signals.

4. The network node of claim 2, wherein the first optical switch is a liquid crystal on silicon (LCOS) switch or a silicon waveguide switch.

5. The network node of claim 2, further comprising a processor coupled to the first optical switch so as to select the first plurality of the output modulated optical signals or the second plurality of the output modulated optical signals.

6. The network node of claim 2 further comprising a processor coupled to the second optical switch so as to select received modulated optical signals for coupling to the wavelength division demultiplexer.

7. The network node of claim 2, further comprising a plurality of optical fiber connectors situated to optically couple the plurality of laser diodes to the first optical switch.

8. The network node of claim 2, further comprising a plurality of optical fiber connectors situated to optically couple the plurality of optical detectors.

9. The network node of claim 2, wherein the first optical switch includes a plurality of fixed reflectors that direct the first plurality of the output modulated optical signals to any of a set of output optical fibers.

10. The network node of claim 2, wherein the first optical switch includes a plurality of fixed reflectors that direct the second plurality of the output modulated optical signals to the optical wavelength division multiplexer.

11. The network node of claim 2, wherein the first optical switch includes at least three inputs that are couplable to selectively allocate modulated optical signals of the first plurality of the output modulated optical signals to any of at least three output optical fibers coupled to the optical wavelength division multiplexer and to selectively allocate modulated optical signals of the first plurality of the output modulated optical signals to any of at least three output optical fibers that are coupled to provide at least three parallel outputs.

\* \* \* \* \*

UNITED STATES PATENT AND TRADEMARK OFFICE
CERTIFICATE OF CORRECTION

PATENT NO. : 10,908,369 B1
APPLICATION NO. : 15/633687
DATED : February 2, 2021
INVENTOR(S) : Mahdi Hayder et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 111 days.

Signed and Sealed this
Tenth Day of January, 2023

Katherine Kelly Vidal
*Director of the United States Patent and Trademark Office*